United States Patent
Bao et al.

(10) Patent No.: US 9,736,877 B2
(45) Date of Patent: Aug. 15, 2017

(54) OFFLINE USER DEVICE COMMUNICATIONS

(71) Applicant: Verizon Patent and Licensing Inc., Arlington, VA (US)

(72) Inventors: Guanqun Bao, Sunnyvale, CA (US); Manish Sharma, San Jose, CA (US); Devin Blong, Penngrove, CA (US); Kevin Flores, San Jose, CA (US); Tushar Chaudhary, Mountain View, CA (US); Gaurav Gupta, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 100 days.

(21) Appl. No.: 14/943,960

(22) Filed: Nov. 17, 2015

(65) Prior Publication Data
US 2017/0142763 A1    May 18, 2017

(51) Int. Cl.
*H04W 76/02* (2009.01)
*H04W 4/00* (2009.01)
*H04W 8/00* (2009.01)
*H04W 84/20* (2009.01)

(52) U.S. Cl.
CPC ......... *H04W 76/023* (2013.01); *H04W 4/008* (2013.01); *H04W 8/005* (2013.01); *H04W 84/20* (2013.01)

(58) Field of Classification Search
CPC ... H04W 76/023; H04W 4/008; H04W 8/005; H04W 84/20
See application file for complete search history.

(56) References Cited

U.S. PATENT DOCUMENTS

| 9,450,667 B2 * | 9/2016 | Lin ..................... H04W 76/023 |
| 2011/0082940 A1 * | 4/2011 | Montemurro ........... H04L 69/24 709/227 |
| 2012/0265818 A1 * | 10/2012 | Van Phan ............... H04W 4/06 709/204 |

(Continued)

OTHER PUBLICATIONS

3GPP TR 22.803 V12.2.0 (Jun. 2013), "3rd Generation Partnership Project; Technical Specification Group Services and Systems Aspects; Feasibility study for Proximity Services (ProSe) (Release 12)" (available at www.3gpp.org).

*Primary Examiner* — Duc C Ho

(57) ABSTRACT

Techniques described herein may be used to enable a user device (e.g., a smartphone, a tablet computer, etc.) to access network services without having to be connected to a network (e.g., a wireless telecommunications network). A first user device may communicate discovery packets in search of other user devices to which the first user device may connect. The first user device may identify a second user device (as a result of sending the discover packets). The first and second user devices may obtain configuration parameters (e.g., a communication channel allocation, encryption keys, synchronization information, etc.) and may establish a D2D connection based on the configuration parameters. The D2D connection may enable the first and second user devices to communicate with another as though the user devices were connected to a wireless telecommunications network (e.g., via telephone calls, video calls, simple messaging services (SMS) messages, instant messages, etc.).

20 Claims, 10 Drawing Sheets

(56) References Cited

U.S. PATENT DOCUMENTS

| | | | | |
|---|---|---|---|---|
| 2014/0148142 A1* | 5/2014 | Hakola | ............... | H04W 8/005 455/418 |
| 2015/0082382 A1* | 3/2015 | Maguire | ............... | H04L 63/08 726/3 |
| 2015/0156165 A1* | 6/2015 | Lindoff | ............... | H04W 8/005 370/329 |
| 2015/0282142 A1* | 10/2015 | Dahlman | ............ | H04W 76/043 370/329 |
| 2016/0057795 A1* | 2/2016 | Kim | ................... | H04W 76/023 370/329 |

* cited by examiner

User devices may broadcast discovery packets to discover other user devices nearby User devices may establish a D2D connection with the assistance of a wireless telecommunications network.

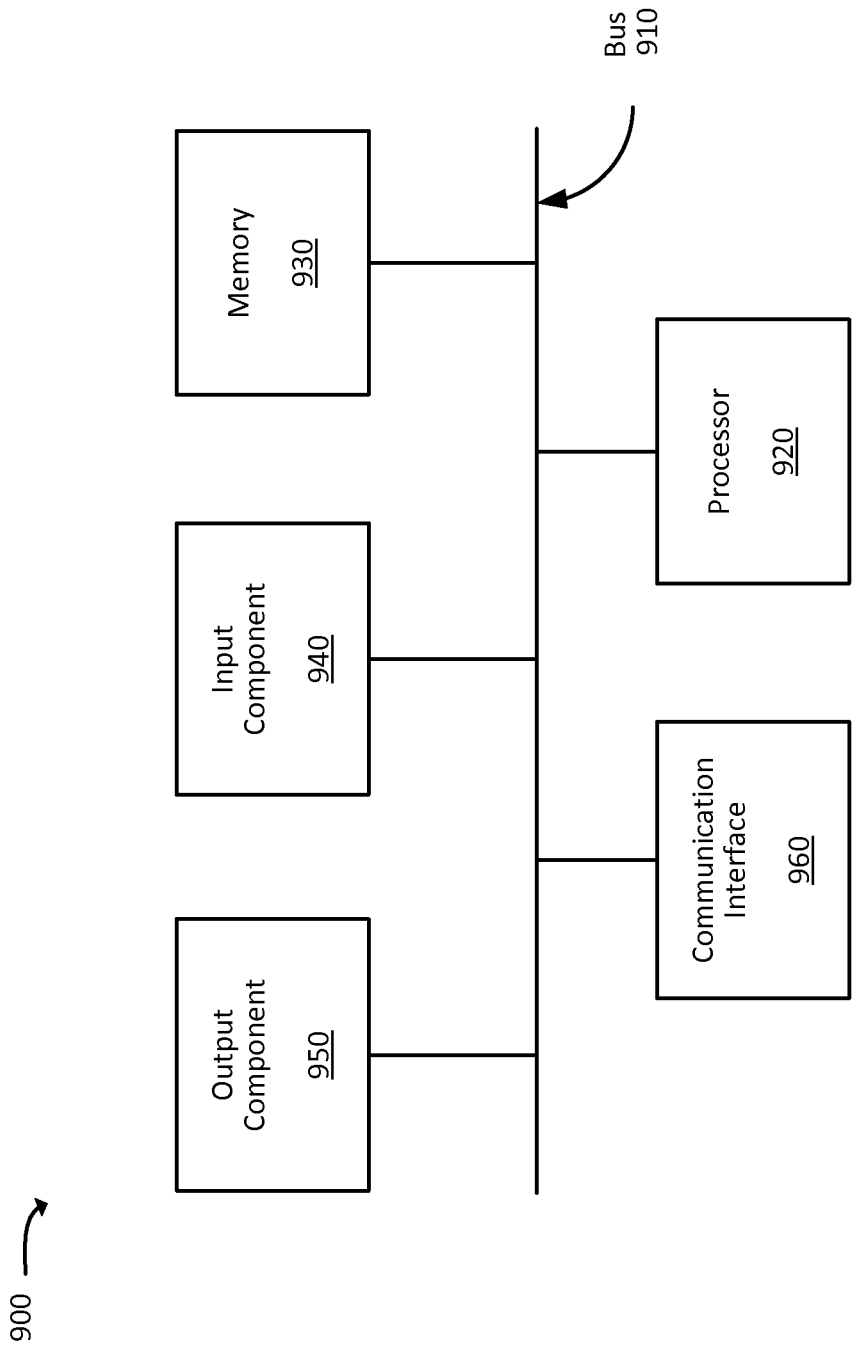

OFFLINE USER DEVICE COMMUNICATIONS

BACKGROUND

User devices (e.g., smartphones, tablet computers, etc.) may enable users to communicate with one another via a network, such as a wireless telecommunications network. For example, users may communicate with one another via voice calls, video calls, simple messaging service (SMS) messages, instant messaging applications, etc. Typically, such activities involve a user device communicating information to the network, the network identifying the user device intended to receive the information, and the network communicating the information to the intended user device. As such, a network often plays a pivotal role in enabling user devices to communicate with one another. Yet, some technologies enable user devices to communicate with one another directly. For instance, some mobile applications use Wi-Fi Direct or Bluetooth to enable user device to communicate with one another directly.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 9 is a diagram of example components of a device.

DETAILED DESCRIPTION OF PREFERRED EMBODIMENTS

Figure 1A:
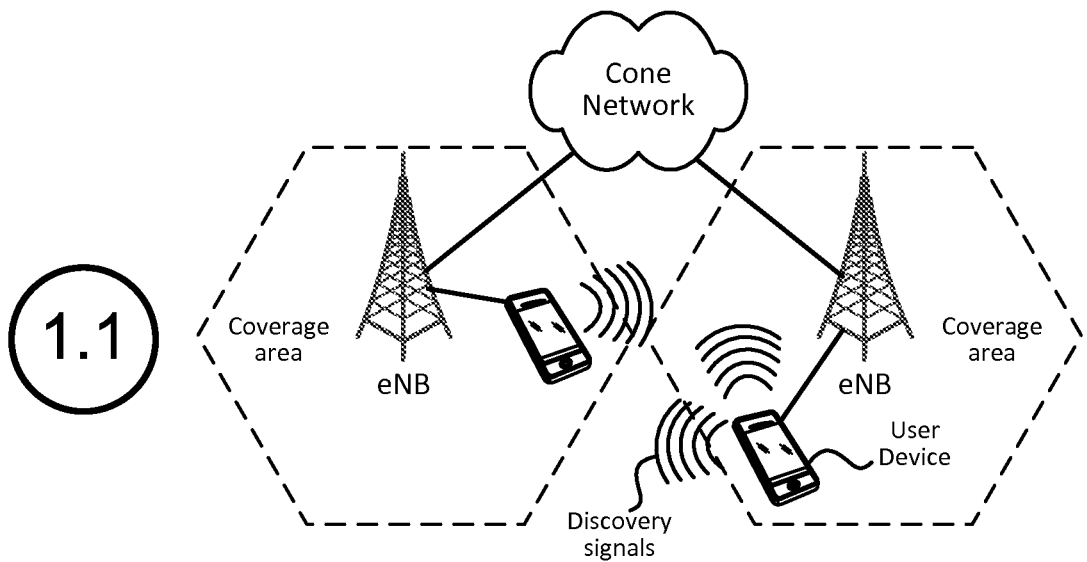
FIGS. 1A-1D illustrate example overviews of implementations described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As mentioned above, user device may communicate with one another by connecting to a network (such as a wireless telecommunications network) or by connecting to one another directly (e.g., via WiFi Direct or Bluetooth). However, each of these forms of communications have certain strengths and weaknesses. For instance, communicating via a wireless telecommunications network may enable user devices to be far away from one another, but may also cost the user money depending on how much time or data is involved in the communication. WiFi Direct eliminates the need for a network and enables a user device to discover other nearby user devices in very low densities (e.g., <10 user devices); however, the amount of battery power required to use WiFi Direct may increase drastically as the number of user devices increases. This is due, at least in part, to WiFi Direct having a two-step discovery process and using an unlicensed frequency spectrum that often requires the user device to overcome uncontrolled interferences from other devices using the same spectrum. Additionally, WiFi Direct has a relatively limited range (e.g., <100 meters). Similar to WiFi, Bluetooth also eliminates the need for a network, but has a very limited range and often uses significant battery power due to interference from other devices using the same frequency spectrum.

Techniques described herein may be used to enable a user device (e.g., a smartphone, a tablet computer, etc.) to access network services without having to be connected to a network (e.g., a wireless telecommunications network). For example, a first user device may communicate discovery packets in search of other user devices to which the first user device may connect. At some point, the first user device may identify a second user device (as a result of sending the discover packets) and invite the second user device to establish a device-to-device (D2D) connection with the first user device.

The second user device may accept the invitation and notify the first user device accordingly. The first and second user devices may then obtain configuration parameters (e.g., a communication channel allocation, encryption keys, synchronization information, etc.) for establishing the D2D connection. The first and second user devices may establish the D2D connection using the configuration parameters. The D2D connection may, for example, enable users of the first and second user devices to communicate with another as though the user devices were connected to a wireless telecommunications network (e.g., via telephone calls, video calls, simple messaging services (SMS) messages, instant messages, etc.).

The D2D connection may include a Long-Term Evolution (LTE) Direct connection with a range of approximately 500 meters. Additionally, the LTE Direct connection may use a licensed spectrum (or band). Using a licensed spectrum may preserve the batter life of the user device as the user device may not have to deal with signal interference (e.g., from other devices using the same frequency spectrum) that might otherwise be present in an unlicensed spectrum. In addition, while the user devices may be communicating via a mobile application (e.g., a messaging application) that includes some security protocols, the LTE Direct connection may introduce additional security due to security key generation and distribution mechanism already available in LTE. As such, the D2D connection established between the user devices may reduce or eliminate the need for a network yet still provide a long range, low power, and high security means of communications between the user devices.

FIGS. 1A-1D illustrate example overviews of implementations described herein. As shown in FIG. 1A, a user device may be connected to a base station (e.g., an enhanced Node B (eNB)) of a wireless telecommunications network. The base stations, in turn, may be connected to a core network. The user devices may broadcast discovery signals in order to identify one or more nearby devices (e.g., other user devices). At some point, a first user device may receive the discovery signal from a second user device. In response, the first user device may communicate a request, to the core network, to establish a D2D connection with the second user device. The core network inform the second user device that the first user device would like to establish a D2D connection.

Figure 1B:
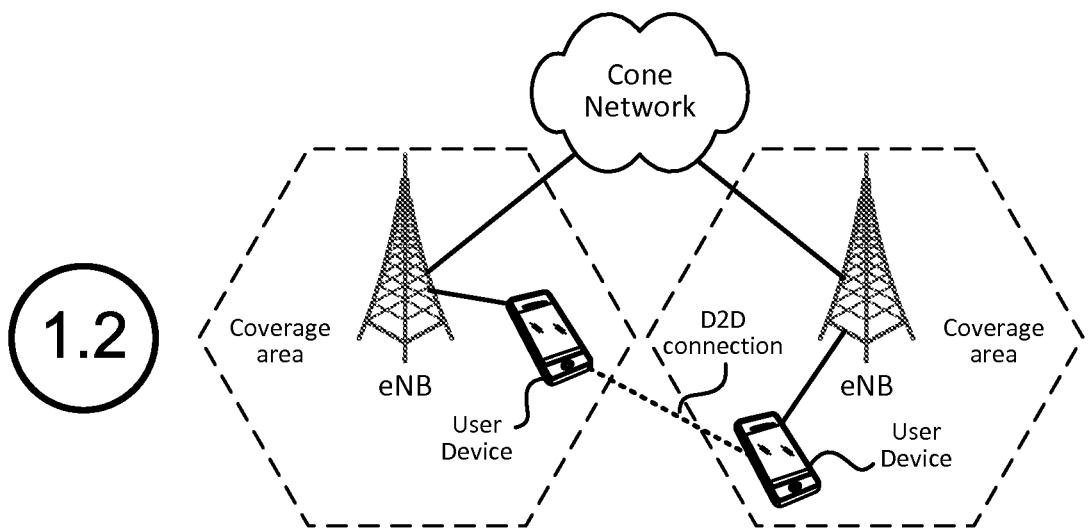

The second user device may respond to the invitation by communicating an acceptance message to the core network, and the core network may notify the first user device that the second user device is willing to establish the D2D connection requested by the first user device. Additionally, the core network may allocate a communication channel for the D2D connection and may provide the first and second user devices with information, such as encryption keys, synchronization information, etc. As shown in FIG. 1B, the first and second user devices may use the information to establish the D2D connection. Since the D2D connection may enable the first and second user devices to communication with one another as though they were connected to the wireless telecommunications network, communications and other information sent between the first and second user device may be sent via the D2D connection instead of wireless telecommunications network.

Figures 1C, 1D:
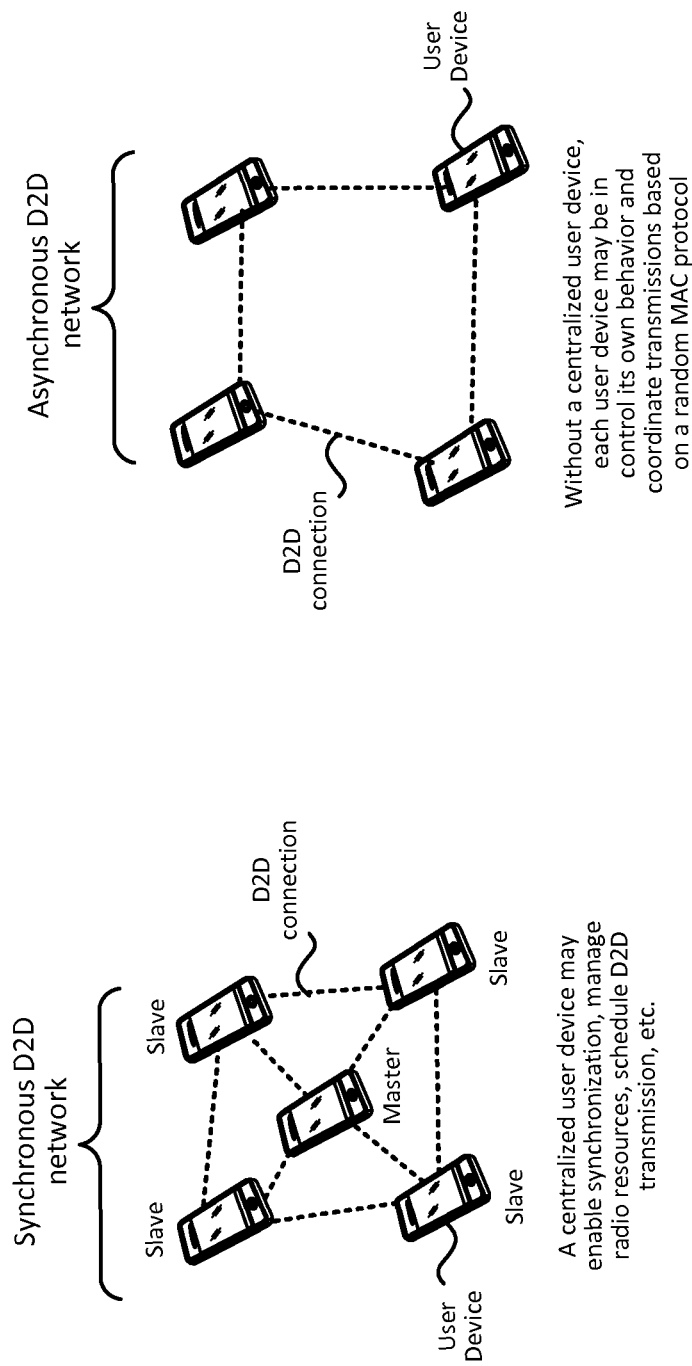

Referring now to FIG. 1C, user devices may establish a synchronous D2D network that enables the user devices to communicate with one another without requiring another network. A synchronous D2D network, as used herein, may include a master-slave network of user devices that are connected via D2D connections. Similar to the example discussed above with reference to FIG. 1A, the synchronous D2D network may be established by user devices broadcasting discovery signals in search of other user devices. Upon discovering other user devices, the user devices may establish a D2D connection with one another.

However, instead of receiving configuration information from a core network, the user devices may receive the configuration parameters from a user device that is operating as a master within the context of a network. A user device operating as a master may manage radio resources, allocate communication channels for D2D connections, schedule D2D transmissions, provide encryption keys to ensure network security, provide registration, provide synchronization information to the user devices, provide registration and authentication services for devices attempting to access the network, etc. In some implementations, the master user device may operate as a small base station for the synchronous D2D network.

By contrast, FIG. 1D provides an example of an asynchronous D2D network. In contrast to the synchronous D2D network of FIG. 1B, a synchronous D2D network may not include a master-slave dynamic imposed upon the user devices of the network. Instead, each user device may operation with a relatively high degree of independence with respect to, for example, establishing D2D connections with other user devices, implementing security policies within the network, etc. In some implementations, the asynchronous D2D network may operate in accordance with a media access control (MAC) protocol, such as carrier sense multiple access (CSMA). As is the case in the D2D connections of FIGS. 1A and 1B, the D2D connections of FIG. 1C may enable user devices to communicate with one another as though connected to a wireless telecommunications network.

In some implementations, the user devices may be capable of dynamically determining the type of network configuration that is most appropriate for a given scenario and self-configuring in order to accommodate the network configuration. For instance, in some implementations, user devices may determine whether a connection with an wireless telecommunications network and, when the connection is available, may establish a D2D network with the assistance of the wireless telecommunications network. In some implementations, when the wireless telecommunications network is not available, the user devices may determine whether any of the user devices is capable of operating as a master device in a master/slave D2D network. When such a user device is available, the user devices may self-configure into a master/slave D2D network and the master user device may manage control plane information, timing, and other aspects of the D2D network. When a master user device is not available, the user devices may self-configure into an ad hoc network, where none of the user devices operates as a master user device. As such, the techniques described herein may enable user devices to dynamically establish D2D networks with one another depending on the available network resources (e.g., a wireless telecommunications network, a master user device, etc.).

Figure 2:
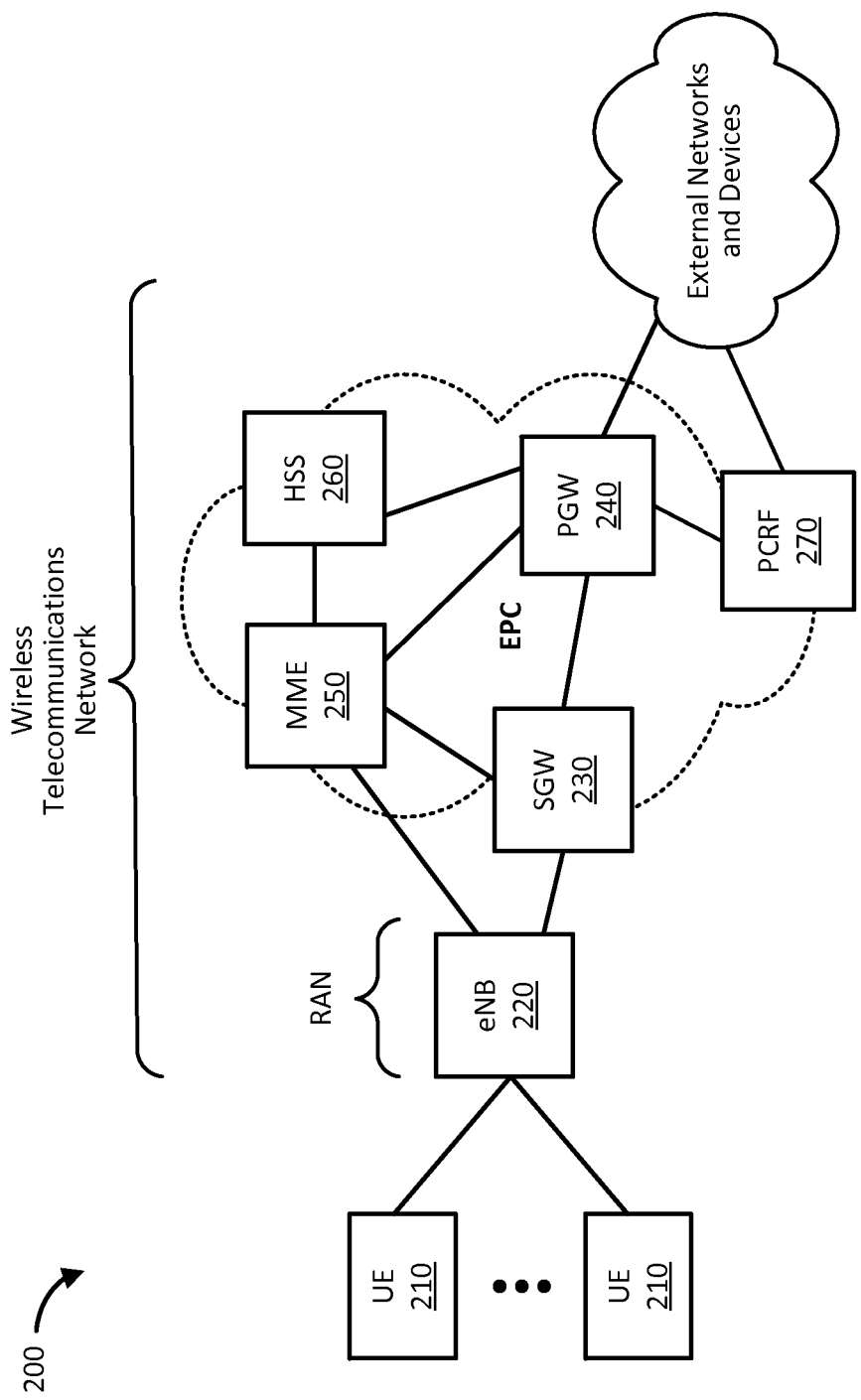
FIG. 2 is a diagram of an example environment in which systems and/or methods described herein may be implemented.

FIG. 2 is a diagram of an example environment 200 in which systems and/or methods described herein may be implemented. Environment 200 may include user devices 210, a wireless telecommunications network, and external networks and devices. The wireless telecommunications network may include an Evolved Packet System (EPS) that includes a Longer Term Evolution (LTE) network and/or an evolved packet core (EPC) network that operates based on a 3rd Generation Partnership Project (3GPP) wireless communication standard. The LTE network may be, or may include, RANs that include one or more base stations, some or all of which may take the form of eNBs 220 via which user devices 210 may communicate with the EPC network.

The EPC network may include Serving Gateway (SGW) 230, PDN Gateway (PGW) 240, Mobility Management Entity (MME) 250, Home Subscriber Server (HSS) 260, and/or Policy and Charging Rules Function (PCRF) 270. As shown, the EPC network may enable user devices 210 to communicate with an external network, such as a Public Land Mobile Networks (PLMN), a Public Switched Telephone Network (PSTN), and/or an Internet Protocol (IP) network (e.g., the Internet).

User device 210 may include a portable computing and communication devices, such as a personal digital assistant (PDA), a smart phone, a cellular phone, a laptop computer with connectivity to the wireless telecommunications network, a tablet computer, etc. User device 210 may also include a non-portable computing device, such as a desktop computer, a consumer or business appliance, or another device that has the ability to connect to a RAN of the wireless telecommunications network. User device 210 may be capable of establishing a D2D connection with another device and using the D2D connection to access certain network services as though connected to a network (such a wireless telecommunications network, the Internet, etc.). A D2D connection, as used, herein, may refer to D2D Proximity Services (ProSe), as defined in the 3rd Generation Partnership Project (3GPP) technical specifications, such as in "3GPP TR 22.803, Technical Specification Group Services and Systems Aspects; Feasibility study for Proximity Services (ProSe) (Release 12)" (available at www.3gpp.org).

eNB 220 may include one or more network devices that receives, processes, and/or transmits traffic destined for and/or received from user device 210 (e.g., via an air interface). eNB 220 may be connected to a network device, such as site router 240, that functions as an intermediary for information communicated between eNB 220 and the EPC.

SGW 230 may aggregate traffic received from one or more eNBs 220 and may send the aggregated traffic to an external network or device via PGW 240. Additionally, SGW 230 may aggregate traffic received from one or more PGWs 260 and may send the aggregated traffic to one or more eNBs 230. SGW 230 may operate as an anchor for the user plane during inter-eNB handovers and as an anchor for mobility between different telecommunication networks. PGW 240 may include one or more network devices that may aggregate traffic received from one or more SGWs 230, and may send the aggregated traffic to an external network. PGW 240 may also, or alternatively, receive traffic from the external network and may send the traffic toward user device 210 (via SGW 230 and/or eNB 220).

MME 250 may include one or more computation and communication devices that act as a control node for eNB 220 and/or other devices that provide the air interface for the wireless telecommunications network. For example, MME 250 may perform operations to register user device 210 with the wireless telecommunications network, to establish bearer channels (e.g., traffic flows) associated with a session with user device 210, to hand off user device 210 to a different eNB, MME, or another network, and/or to perform other operations. MME 250 may perform policing operations on traffic destined for and/or received from user device 210. In some implementations, MME 250 may provide user devices 210 with configuration information (e.g., encryption keys, synchronization information, etc.) for establishing a D2D connection between user devices 210.

HSS 260 may include one or more devices that may manage, update, and/or store, in a memory associated with HSS 260, profile information associated with a subscriber (e.g., a subscriber associated with user device 210). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with user device 210. Additionally, or alternatively, HSS 260 may perform authentication, authorization, and/or accounting operations associated with the subscriber and/or a communication session with user device 210.

PCRF 270 may receive information regarding policies and/or subscriptions from one or more sources, such as subscriber databases and/or from one or more users. PCRF 270 may provide these policies to PGW 240 or another device so that the policies can be enforced. As depicted, in some implementations, PCRF 270 may communicate with PGW 240 to ensure that charging policies are properly applied to locally routed sessions within the telecommunications network. For instance, after a locally routed session is terminated, PGW 240 may collect charging information regarding the session and provide the charging information to PCRF 270 for enforcement.

Figure 3:
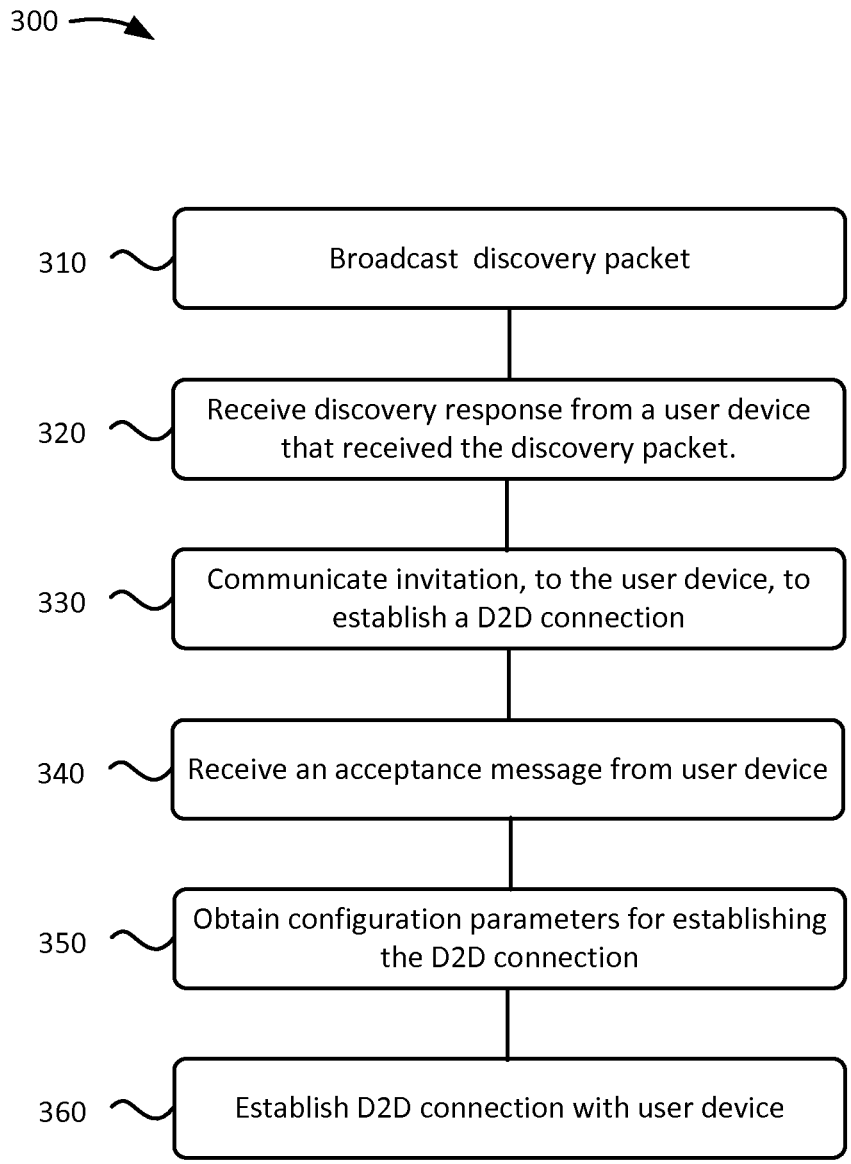
FIG. 3 is a flowchart diagram of an example process for establishing a device-to-device (D2D) connection with a user device.

FIG. 3 is a flowchart diagram of an example process 300 for establishing a D2D connection with user device 210. In some implementations, process 300 may be implemented by user device 210. In some implementations, process 300 may be implemented by a combination of user device 210 and one or more devices of a core network, which may include one or more of the EPC devices described above with reference to FIG. 2.

As shown, process 300 may include broadcasting a discovery packet (block 310). For example, user device 210 may transmit a wireless signal in an attempt to make contact with other user devices 210. A discovery packet may include information identifying user device 210, information representing the purpose of the discovery packet, and a request to reply to the discovery packet. In some implementations, user device 210 may periodically broadcast discovery packets as a matter of course. In some implementations, user device 210 may broadcast discover packets in response to a command from a user, in response to the user opening a mobile application, in response to being at a particular geographical location (e.g., an outside the coverage area of a wireless telecommunications network, etc.)

Process 320 may include receiving a discovery response from a particular user device (block 320). For example, user device 210 may receive a message, from another user device, a response to the discovery packet broadcasted by user device 210. The discovery response may include information identifying the user device 210 that sent the discovery response, information representing the wireless capabilities of the user device 210 (e.g., D2D capabilities) that sent the discovery response, a request to establish a D2D connection, etc. For simplicity, the user device that broadcasted the discovery packet may be referred to herein as the broadcasting device 210, whereas the user device 210 that sent the discovery response may be referred to as the responding device 210.

Process 300 may include communicating an invitation to the responding device 210, to establish a D2D connection (block 530). For instance, the broadcasting device 210 may communicate a request, to a wireless communications network (e.g., to the core network), to establish a D2D connection with the responding device 210. The request may include the identity of the broadcasting device 210 and the identity of the responding device 210. The identity of the responding device 210 may be known to the broadcasting device 210 since the identity may, for example, have been included in the discovery response. The core network may respond to the request by sending an invitation, to the responding device 210, to establish the D2D connection. As such, the broadcasting device 210 may cause an investigation to be communicated to the responding device 210 by sending a request for the D2D connection to the core network.

In scenarios where the broadcasting device 210 is not located within the coverage area of a wireless telecommunications network, the broadcasting device 210 may communicate the invitation to establish the D2D connection via another user device 210. For instance, if user device 210 is a slave device of a synchronous D2D network (described above with reference to FIG. 1B), user device 210 may communicate a request for the D2D connection to a user device 210 operating as a master device in the synchronous D2D network, and the master user device 210 may send an invention to the responding device 210. However, if user device 210 is operating as the master device, the user device 210 may communicate the invitation directly to the responding device 210. Similarly, in scenarios where the broadcasting device 210 is part of an Asynchronous D2D network (described above with reference to FIG. 1C), the broadcasting device 210 may communicate the invitation directly to the responding device 210. In some implementations, if the broadcasting device 210 is part of an asynchronous D2D network, the broadcasting device 210 may have to send the invitation in accordance with a MAC protocol such as CSMA.

Process 300 may include receiving an acceptance message from the responding user device 210 (block 340). For example, the broadcasting device 210 may receive a notification that the responding device 210 has accepted the invention to establish the D2D connection with the broadcasting device 210. In implementations where the broadcasting is connected to a wireless telecommunications network, the acceptance images may be received from the core network. In implementations, where the broadcasting device 210 is a slave device in a synchronous D2D network, the broadcasting device 210 may receive the acceptance message from a master device of the synchronous D2D network. Additionally, if the broadcasting device 210 is operating as a master device in a synchronous D2D network or is part of an asynchronous D2D network, the broadcasting device 210 may receive the acceptance message directly from the responding device 210.

Process 300 may include obtaining configuration parameters for establishing the D2D connection (block 350). For example, the broadcasting device 210 may obtain synchronization information, encryption keys, etc., in order to be able to establish the D2D connection. In some implementation, the broadcasting device 210 may receive the configuration parameters form the core network. In some implementations, the broadcasting device 210 may receive the configuration parameters form another user device 210 operating as a master device in a synchronous D2D network.

When the broadcasting device is operating as a master device in a synchronous\ D2D network, the broadcasting device may already have the configuration parameters due to the role of the master device in the synchronous D2D network. When the broadcasting device 210 is part of an asynchronous D2D network, the broadcasting device 210 may obtain the configuration parameters by virtue of the communication standard implemented by broadcasting device 210 and/or as a result of negotiating the configuration parameters with another device, such as the responding device 210.

Process 300 may include establishing a D2D connection with the responding user device 210 (block 360). For example, the broadcasting device 210 and the resounding device 210 may establish the D2D connection using the configuration parameters that were previously obtained. In some implementations, the D2D connection may include a wireless, peer-to-peer connection directly between the broadcasting device 210 and the responding device 210. Additionally, or alternatively, the D2D connection may refer to D2D Proximity Services (ProSe), as defined in the 3rd Generation Partnership Project (3GPP) technical specifications, such as in "3GPP TR 22.803, Technical Specification Group Services and Systems Aspects; Feasibility study for Proximity Services (ProSe) (Release 12)" (available at www.3gpp.org).

While the broadcasting device 210 and the responding device 210 may be disconnected from any other network (e.g., offline), the D2D connection may enable the broadcasting device 210 and the responding device 210 to communicate with one another in a manner that is consistent with the being online. For instance, the D2D connection may include an LTE Direct connection that may reduce or eliminate the need for a network connection yet still provide a long range, low power, and high security means of communications between user devices 210.

Figure 4:
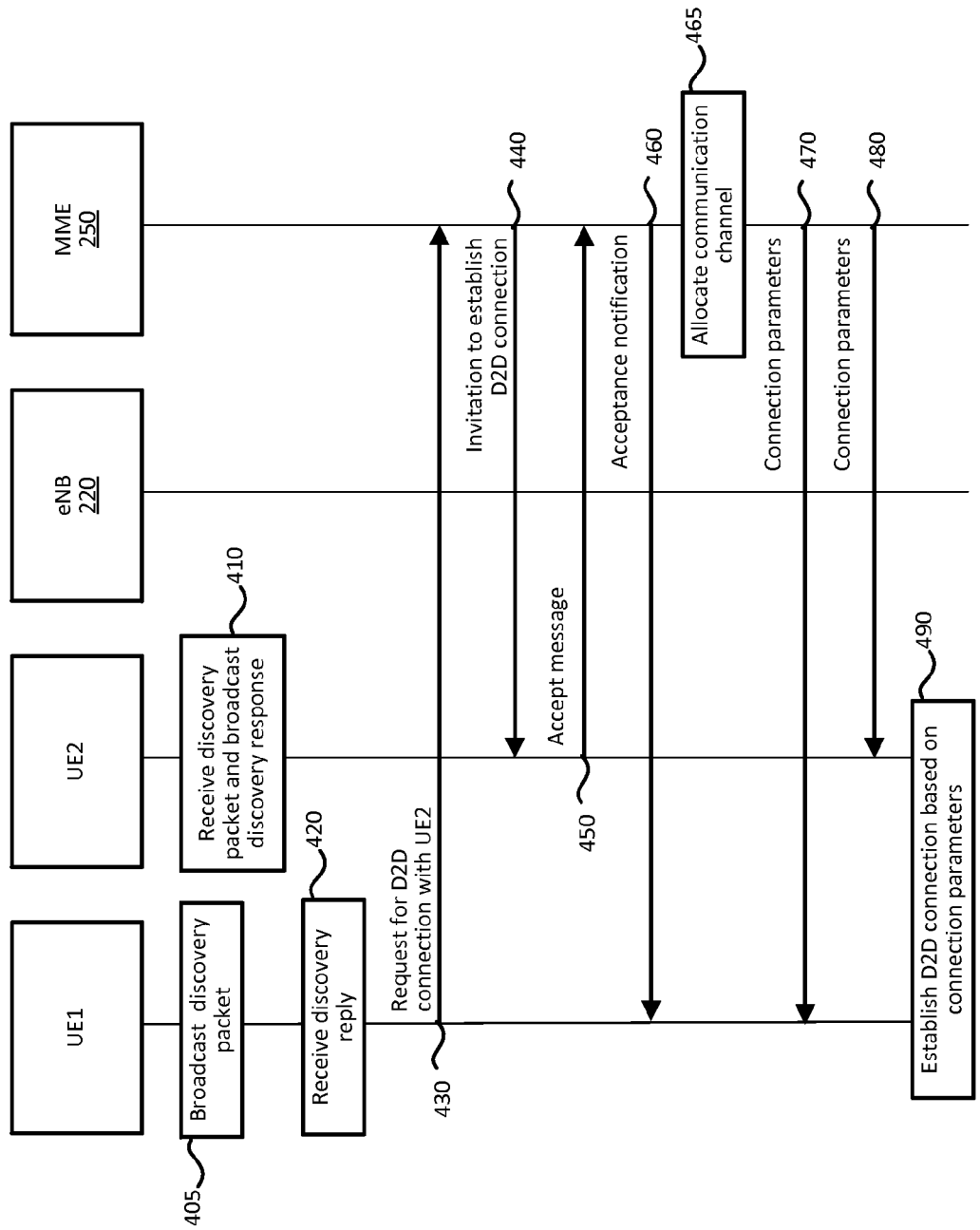
FIG. 4 is a sequence flow diagram of an example for establishing a D2D connection between user devices with the assistance of a wireless telecommunications network.

FIG. 4 is a sequence flow diagram of an example for establishing a D2D connection between user devices 210 with the assistance of a wireless telecommunications network. As shown, FIG. 4 includes UE1, UE2, eNB 220, and MME 250. UE1 and UE2 may each be example of user devices 210 described throughout this specification. Additionally, communication between UE1 and MME 250, and between UE2 and MME 250 may occur via eNB 220. For the purposes of this example, assume that UE1 and UE2 are located within the broadcast ranges of one another.

As shown, UE1 may broadcast a discovery packet in an attempt to, for example, make contact with computing and communicating devices in the area (block 405). Among other information, the discovery packet may include an identifier of UE1, a greeting, etc. UE2 may receive the discovery packet and respond by broadcasting a discovery response (block 410). Similar to the discovery packet, the discovery response may include, among other information, an identifier of UE2. UE1 may receive the discovery response (block 420) and communicate a request for a D2D connection with UE2 (line 430). The request may include the identifiers of UE1 and UE2. Additionally, as shown, the request may be sent to a core network device, such as MME 250.

MME 250 may respond to the request by communicating, to UE2, an invitation to establish a D2D connection with UE1 (line 440). MME 250 may be able to send the information to UE2 since UE1 included the identity of UE2 in the request to establish the D2D connection. In addition, the invitation sent to UE2 by MME may properly identify UE1 (which would be significant to UE2) since the request for the D2D connection also included the identity of UE1. As such, UE2 may compare the identifier (of UE1) included in the discovery packet to the identifier (of UE1) included in the invitation in order to verify that the discovery packet and the invitation to establish the D2D connection corresponding to the same user device (i.e., UE1).

UE2 may respond by communicating an accept message to MME 250. (line 450) and MME may notify UE1 that UE2 is willing to establish the D2D connection requested by UE1. MME 250 may allocate a communication channel to the D2D connection (block 465) and may provide connection parameters, for establishing the D2D connection, to UE1 and UE2 (lines 470 and 480). As mentioned above, connection parameters may include settings, protocol information, security information, synchronization information, and other types of information for establishing a secure, reliable, D2D connection between UE1 and UE2. As such, UE1 and UE2 may use the connection parameters to establish the D2D connection (block 490) which may enable UE1 and UE2 to communicate directly with one another but with the same quality, reliability, and bandwidth as communicating via the wireless telecommunications network.

Figure 5:
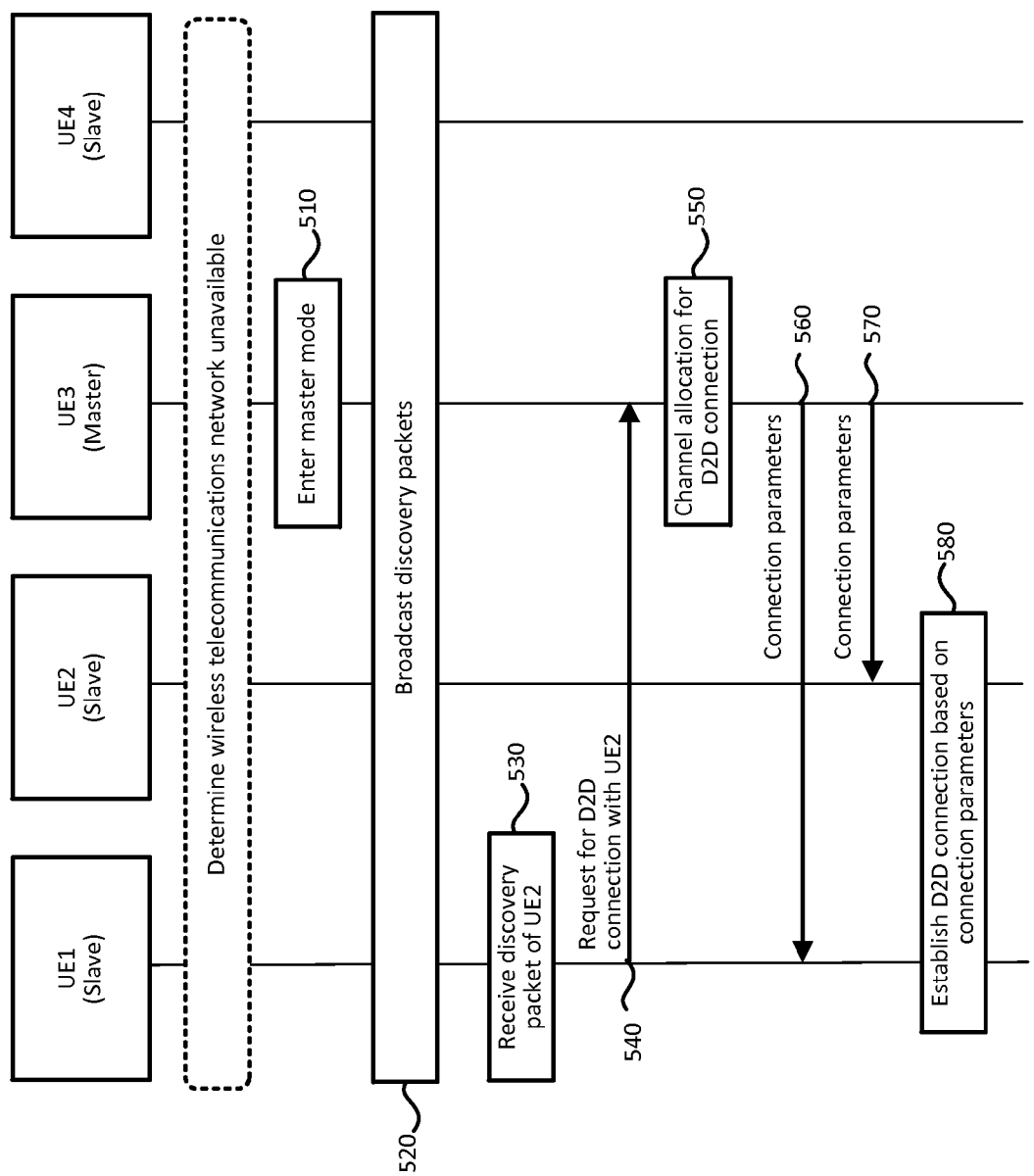
FIG. 5 is a sequence flow diagram of an example for establishing a D2D connection between user devices within a synchronous D2D network environment.

FIG. 5 is a sequence flow diagram of an example for establishing a D2D connection between user devices 210 within a synchronous D2D network environment. As shown, FIG. 5 includes UE1, UE2, UE3, and UE4. UE1 and UE2 may each be example of user devices 210 described throughout this specification. UE1, UE2, and UE4 may capable of functioning as slave devices within a synchronous D2D network, and UE3 may be capable of functioning as a master device within a synchronous D2D network. For the purposes of this example, assume that UE1, UE2, UE3, and UE4 are located within the broadcast ranges of one another.

As shown, UE1, UE2, UE3, and UE4 may determine that they are unable to connect to a wireless telecommunications network. For instance, UE1, UE2, UE3, and UE4 may be located in a basement of a building, in a canyon, or simply far away from the nearest base station. As such, the user of UE1, UE2, UE3, and UE4 may decide to form a synchronous D2D network in order to communicate with one another via D2D connections. In some implementations, the users may decide to form the network regardless of whether connecting to a wireless telecommunications network is a possibility.

UE3 may enter into a master mode (block 510). For instance, a user of UE3 may launch a mobile application, enable an operating system feature, or configure settings of UE3 in a particular way so as to cause UE3 to enter into a master mode. The master mode may cause UE3 to operate as a master device in a master-slave network. As such, UE3 may manage radio resources within the network, manage a control plane of the network, allocate communication channels for D2D connections, schedule D2D transmissions, provide encryption keys to ensure network security, provide registration, provide synchronization information to devices in the network, provide registration and authentication services for devices attempting to access the network, etc. For the purposes of this example, assume that by entering into a master mode, UE3 establishes a D2D connection with UE1, UE2, and UE4.

UE1, UE2, UE3, and UE4 may broadcast discovery packets (block 520). As mentioned above, a discovery packet may include, among other information, an identifier of the device broadcasting the packet. In the example of FIG. 5, UE1 receives a discovery packet from UE2 (block 530). In response, UE1 may communicate a request to UE3 to establish a D2D connection between UE1 and UE2 (line 540). UE3 may allocate a communication channel for the D2D connection (block 550) and may provide connection parameters to UE1 and UE2 (lines 560 and 570). UE1 and UE2 may user the configuration information to establish a D2D connection between UE1 and UE2. In some implementations, the connections between UE3 and each of UE1, UE2, and UE4 may include control plane connections that UE3 may use to manage and control the synchronous D2D network, while the connections between UE1 and UE2, between UE2 and UE4, etc., include user plane connection that may be used to communicate user information, application information, and other types of user plan information.

Figure 6:
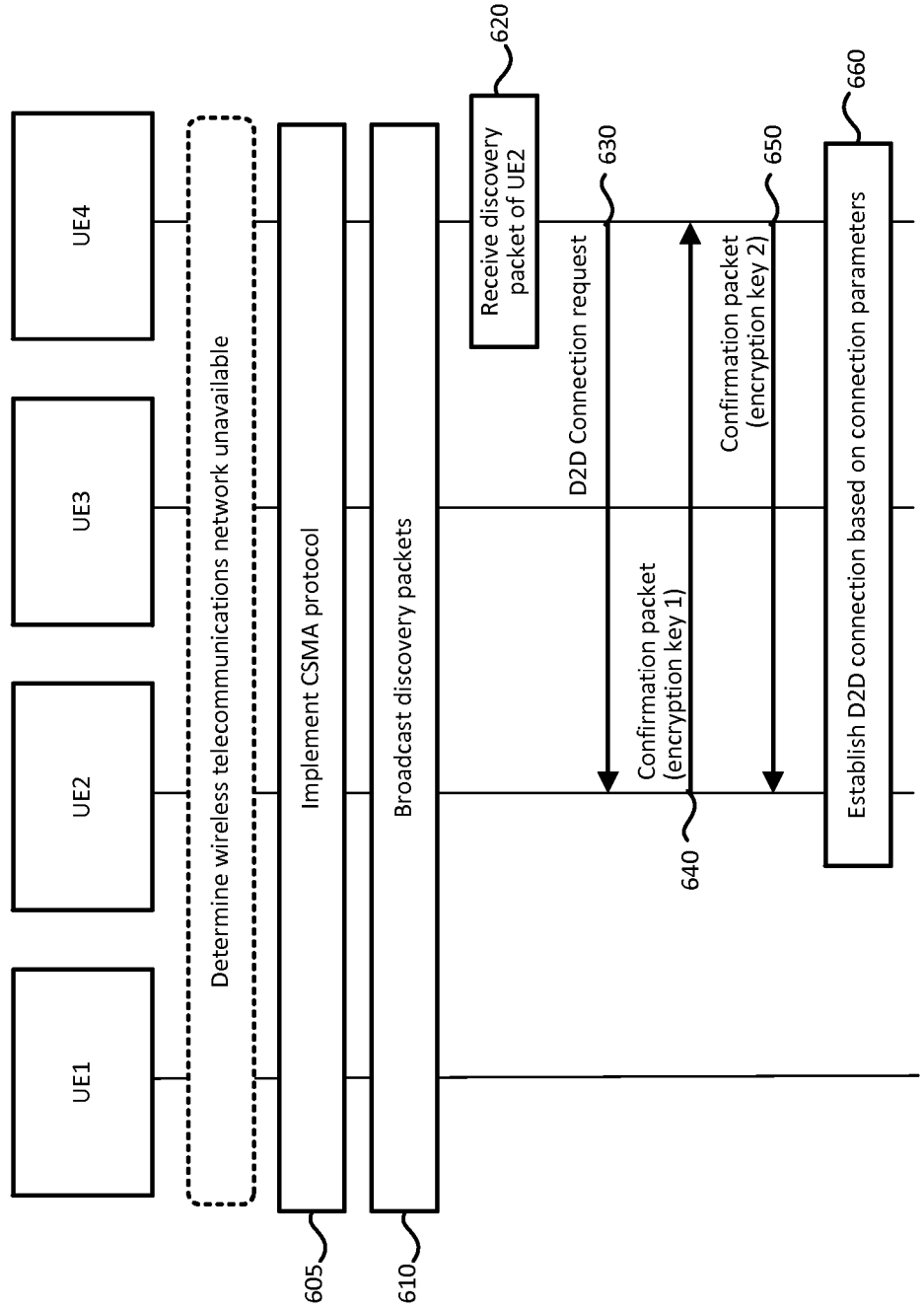
FIG. 6 is a sequence flow diagram of an example for establishing a D2D connection between user devices within an asynchronous D2D network environment

FIG. 6 is a sequence flow diagram of an example for establishing a D2D connection between user devices 210 within an asynchronous D2D network environment. As shown, FIG. 6 includes UE1, UE2, UE3, and UE4. UE1 and UE2 may each be example of user devices 210 described throughout this specification. For the purposes of this example, assume that UE1, UE2, UE3, and UE4 are located within the broadcast ranges of one another.

As shown, UE1, UE2, UE3, and UE4 may determine that they are unable to connect to a wireless telecommunications network. For instance, UE1, UE2, UE3, and UE4 may be located in a basement of a building, in a canyon, or simply far away from the nearest base station. Additionally, assume that none of UE1, UE2, UE3, and UE4 may be capable of functioning as master or a slave device. As such, the user of UE1, UE2, UE3, and UE4 may form an asynchronous D2D network in order to communicate with one another via D2D connections. An asynchronous D2D network may not have a device that is in charge of monitoring and managing the network; instead, each device in the network operates in a relatively independent manner. In some implementations, UE1, UE2, UE3, and UE4 may implement a MAC protocol, such as CSMA, which may provide some level of organization and synchronization amongst UE1, UE2, UE3, and UE4 (block 605).

UE1, UE2, UE3, and UE4 may broadcast discovery packets (block 610). As mentioned above, a discovery packet may include, among other information, identifier of the device broadcasting the packet. In the example of FIG. 6, UE4 receives a discovery packet from UE2 (block 620). In response, UE4 may communicate a request to UE3 to establish a D2D connection between UE2 and UE4 (line 630). UE2 may respond by communicating a confirmation packet to UE4. The confirmation packet may include connection parameters such as an encryption key (e.g., encryption key 1) (line 640). Similarly, UE4 may communicate a confirmation packet to UE2, which may also include connection parameters such as an encryption key (e.g., encryption key 2) (line 650). UE2 and UE4 may use the connection parameters to establish the D2D connection (block 660) which may enable UE2 and UE4 to communicate directly with one another with the same quality, reliability, and bandwidth as communicating with one another via the wireless telecommunications network.

Figure 7:
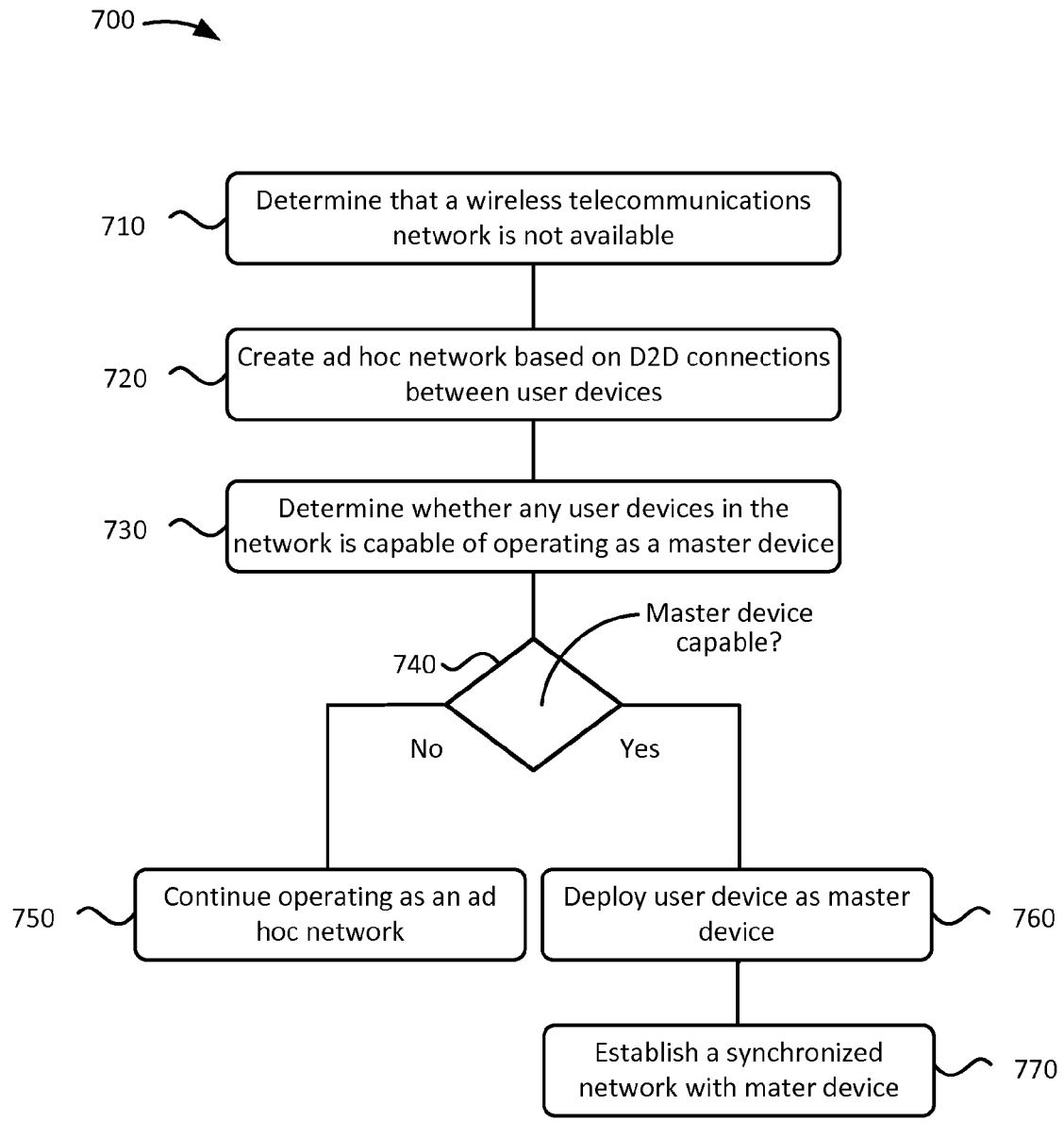
FIG. 7 is a flowchart diagram of an example process for converting an asynchronous D2D network to a synchronous D2D network.

FIG. 7 is a flowchart diagram of an example process for converting an asynchronous D2D network to a synchronous D2D network. In some implementations, process 300 may be implemented by one or more user devices 210.

As shown, process 700 may include determining that a wireless telecommunications network is not available (block 710). As described above, user device 210 may determine whether a wireless telecommunications network is available to user device 210. While user device 210 may proceed to establish a D2D connection to another user device regardless of the availability of a wireless telecommunications, the availability of the wireless telecommunications network may determine how user device 210 establishes the D2D connection. For instance, as described above with reference to FIG. 1A, user device 210 may establish a D2D connection with the assistance of the wireless communications network. However, as explained above with reference to FIGS. 1B, 1C, and 1D, user device 210 may still establish a D2D connection without the assistance of the wireless telecommunications network. As such, user device 210 may determine whether the wireless telecommunications network is available in order to determine the options that are available to user device 210 for establishing the D2D connection.

Process 700 may include creating an ad hoc network based on D2D connections between user devices 210 (block 720). For instance, user device 210 may create an ad hoc network by establishing D2D connections with other user devices 210 without any of the user device operating as a master device. For instance, user device 210 establishes D2D connections with other user devices, without the assistance of a telecommunications network, the resulting network may be an asynchronous (or ad hoc) network unless one of the participating user devices 210 begins operating as a master device (as described above with reference to FIGS. 1B and 5). With reference to process 700, assume an asynchronous (or ad hoc) network is created because none of the participating user devices 210 are capable (or currently configured) to operate as a master device for the network.

Process 700 may include determining whether any user device in the network is capable of operating as a master device (block 730). For example, user device 210 may communicate with other user devices 210 in the ad hoc network to determine whether any user device 210 is capable of being a master device for the ad hoc network. In some implementations, determining whether a particular user device 210 may be a master device may include the availability of system resources (e.g., processing capacity, memory capacity, available bandwidth, etc.), whether a master device feature in an operating system or mobile application of user device 210 is enabled, whether user device 210 is being operated by a user, the number and quality of network interfaces of user device 210, whether user device 210 is configured to operate in "master device" mode, etc.

If none of the user devices 210 in the ad hoc network is capable of operating as a master device (block 740—No), process 700 may include continuing to operatre as an ad hoc (or asynchronous) network. If a particular user device 210 in the ad hoc network is capable of operating a master device (block 740—Yes), process 700 may include deploying the particular user device as a master device. When multiple user devices 210 are capable of operating as a master device, user devices 210 may determine which user device 210 is the most capable of operating as a master device, based on factors such as the availability of the user device, the system resources (e.g., processing capacity, memory capacity, etc.) of the user device, the user device with the most up-to-date software, etc. In some implementations, deploying user device 210 as a master device may include providing user device 210 with information and authorization to allocate communication channels, schedule D2D transmissions, provide encryption keys, enforce network security policies, provide synchronization information to devices 210, provide registration and authentication services, etc. In some implementations, the other user devices 210 in the network may be informed (and/or configured) to being operating as slaved devices with respect to the master device.

Process 700 may include establishing a synchronized network with the master device (block 770). In some implementations, establishing the synchronized network may include terminating D2D connections used to create the ad hoc network and enabling the D2D connections to be reestablished with the cooperation and management of the master device. In some implementations, the synchronized network may be established, without having to reestablish the D2D connections, by transferring the management of the existing D2D connections to the master device. Similarly, certain user device operations (e.g., transmission times, security strategies, etc.) may be transitioned into being subject to the master device. As such, techniques described herein may enable an asynchronous D2D network to be transitioned into a synchronous D2D network.

Figure 8:
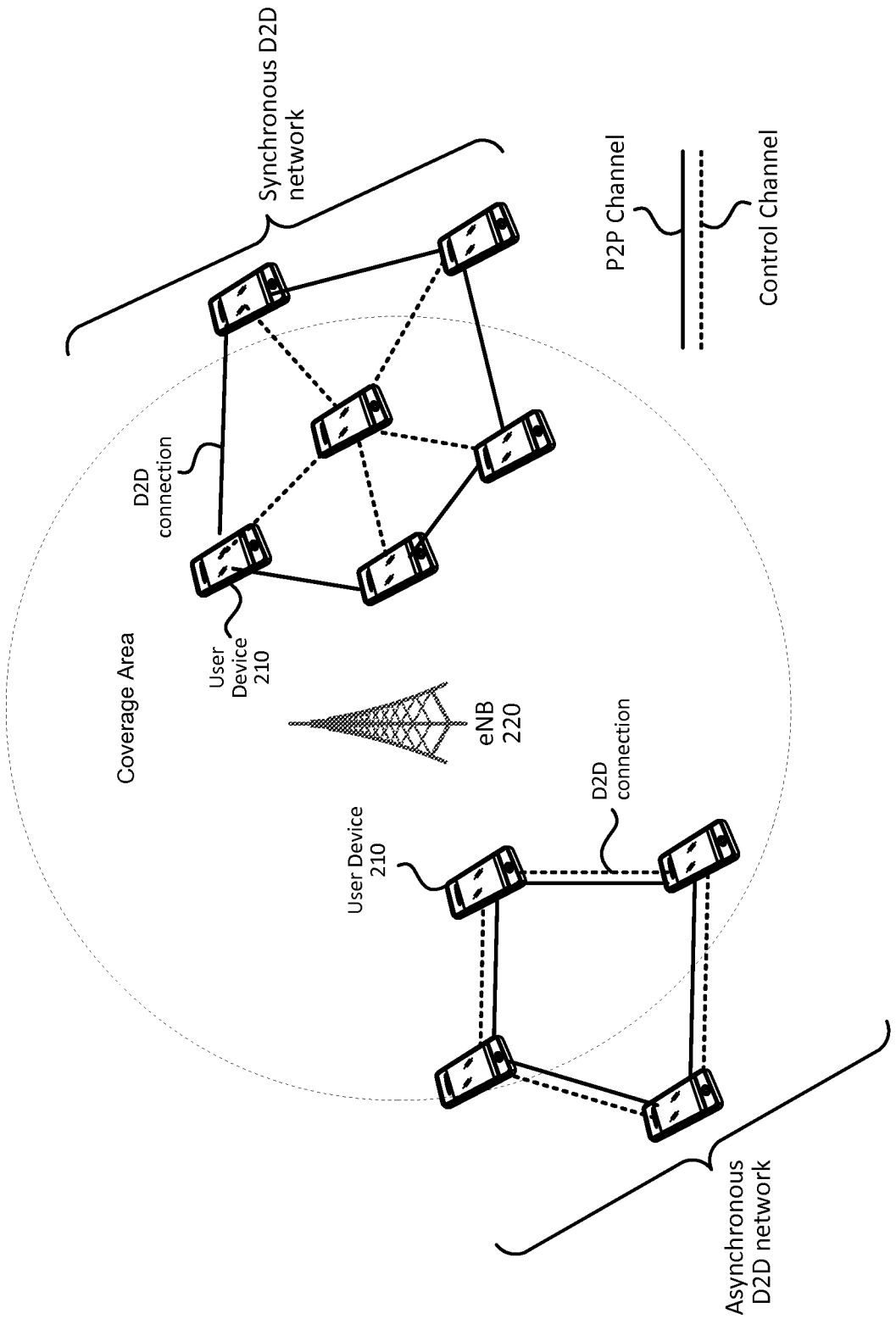
FIG. 8 is a diagram of an example synchronous D2D network environment and an example asynchronous D2D network near an enhanced Node B (eNB)

FIG. 8 is a diagram of an example synchronous D2D network environment and an example asynchronous D2D network near eNB 220. As shown, the example of FIG. 8 includes eNB 220 and multiple user devices 210 divided into to two networks. One network includes a synchronous D2D network of user devices and the other network include an asynchronous D2D network of user devices. Additionally, some user devices 210 may be located within a coverage area of eNB 220, while other user devices 210 may not be located within the coverage area of eNB 220.

As described above, user devices 210 of the synchronous D2D network may consist of a master device and slave devices. The master device may manage the synchronous D2D network, allocate communication channels to D2D connections, ensure that security policies are implemented, etc. By contrast, user devices 210 of the asynchronous D2D network may operate more independently with respect to, for example, transmission timing, ensuring security, etc. In the example depicted in FIG. 8, user devices 210 of asynchronous D2D network may be in an asynchronous D2D network because: 1) at least one of the user devices 210 is outside the coverage area of eNB 230 so a network supported D2D network may not be possible; and 2) none of the user device 210 may be operating, or capable of operating, as a master device (which is frequently required for a synchronous D2D network).

In some implementations, user devices 210 of the asynchronous D2D network may be capable of transitioning into a network that is supported by a core network (see, e.g., FIG. 1) if/when the user devices outside the coverage area were to relocate within the coverage area. Nevertheless, even if each user device 210 of the asynchronous D2D network were located within the coverage area, the user devices 210 may remain in an asynchronous D2D network due to the preferences of the user to do so. Similarly, a particular user device 210 of the asynchronous D2D network may be capable of operating as a master device, which may enable the asynchronous D2D network to transition into a synchronous D2D network, similar to the synchronous D2D network depicted. However, even if one of the user devices 210 of the asynchronous D2D network could operate as a master device the asynchronous D2D network may not transition to a synchronous D2D network based on, for example, the preferences of the user.

In a similar manner, the synchronous D2D network may undergo one or more transitions based on changes in the user devices 210 that make up the synchronous D2D network. For instance, if the master device of the synchronous D2D network were to leave the network, the synchronous D2D network may transition to an asynchronous D2D network unless another device is capable of replacing the master device. Additionally, or alternatively, if devices of the synchronous D2D network were to move into the coverage area of eNB 220, the synchronous D2D network may transition into a network-supported D2D network, similar to the network described above with reference to FIGS. 1A and 1B. However, in some implementations, even if each user device 210 of the synchronous D2D network were located within the coverage area, the user devices 210 may remain in the synchronous D2D network due to, for example, the preferences of the users to do so.

FIG. 9 is a diagram of example components of a device 900. Each of the devices illustrated in FIGS. 1A-2, 4-6, and 8 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of lines, arrows, and/or blocks have been described with regard to FIGS. 3-7 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method performed by a user device, comprising:
   determining, by the user device, whether a connection with a wireless telecommunications network is available to the user device;
   when the connection with the wireless telecommunications network is available,
      establishing a connection with the wireless telecommunications network,
      communicating a first signal to discover other user devices within a vicinity of the user device,
      receiving a first response to the first signal from another user device,
      communicating, to the other user device, a first invitation to establish a first device-to-device (D2D) connection with the other user device,
      receiving a first acceptance, corresponding to the first invitation, from the other user device,
      obtaining configuration information, for establishing the first D2D connection, from the wireless telecommunications network,
      establishing the first D2D connection with the other user device based on the first configuration information, and
      using the connection with the wireless telecommunications network for first control information and the first D2D connection to communicate with other user device directly; and
   when the connection with the wireless telecommunications network is not available,
      communicating a second signal to discover the other user devices within the vicinity of the user device,
      receiving a second response to the second signal from the other user device, communicating, to the other user device, a second invitation to establish a second device-to-device (D2D) connection with the other user device,
receiving a second acceptance, corresponding to the second invitation, from the other user device,
establishing the second D2D connection with the other user device, and
using the second D2D connection with the other user device for second control information and to communicate with other user device directly.

2. The method of claim 1, wherein the communicating of the first invitation includes communicating a request, to a Mobility Management Entity (MME) of a wireless telecommunications network, to establish the first D2D connection with the other user device.

3. The method of claim 2, wherein the receiving of the first acceptance message includes receiving the first acceptance message from the MME.

4. The method of claim 3, wherein the obtaining of the configuration information includes receiving the configuration information from the MME.

5. The method of claim 1, wherein the establishing of the second D2D connection with the other user device includes:
determining whether the user device or the other user device is capable of operating as a master device in a master/slave D2D network,
when at least one of the user device or the other user device is capable of operating as the master device,
establishing the second D2D connection with the user device or the other user device as the master device, and
when neither the user device or the other user device is capable of operating as the master device,
establishing the second D2D connection in accordance with an ad hoc D2D network.

6. The method of claim 5, wherein,
when both the user device or the other user device is capable of operating as the master device, the method further comprises:
determining which of the user device or the other user device is most capable of operating as the master device, and
establishing the second D2D connection with the master device being the most capable of the user device and the other user device.

7. The method of claim 5, wherein,
when the establishing of the second D2D connection includes the user device operating as the master device, the method further comprises:
initiating, by the user device, a master device mode of the user device, and
when the establishing of the second D2D connection includes the other user device operating as the master device,
initiating, by the user device, a slave device mode of the user device.

8. The method of claim 5, wherein operating as a master device includes at least one of:
managing radio resources of the synchronous D2D network,
managing a control plane of the synchronous D2D network,
allocating communication channels of the synchronous D2D network,
scheduling D2D transmissions,
providing encryption keys to ensure network security,
providing registration services to the synchronous D2D network, or
provide synchronization information to devices in the synchronous D2D network.

9. The method of claim 5, wherein,
when the establishing of the second D2D connection with the other user device includes the establishing of the second D2D connection in accordance with an ad hoc D2D network, the method further comprises:
communicating with a third user device;
determining whether the third user device is capable of operating as the master device in the master/slave D2D network, and
when the third user device is capable of operating as the master device,
converting the ad hoc D2D network into the master/slave D2D network with the third user device as the master device of the master/slave D2D network, and
when the third user device is not capable of operating as the master device,
establishing a third D2D connection, with the third user device, in accordance with the ad hoc D2D network.

10. A user device, comprising:
a non-transitory memory device storing a plurality of processor-executable instructions; and
a processor configured to execute the processor-executable instructions, wherein executing the processor-executable instructions causes the processor to:
determine whether a connection with a wireless telecommunications network is available to the user device;
when the connection with the wireless telecommunications network is available,
establish a connection with the wireless telecommunications network,
communicate a first signal to discover other user devices within a vicinity of the user device,
receive a first response to the first signal from another user device,
communicate, to the other user device, a first invitation to establish a first device-to-device (D2D) connection with the other user device,
receive a first acceptance, corresponding to the first invitation, from the other user device,
obtain configuration information, for the first D2D connection, from the wireless telecommunications network,
establish the first D2D connection, with the other user device, based on the first configuration information, and
use the connection with the wireless telecommunications network for first control information and the first D2D connection to communicate with other user device directly; and
when the connection with the wireless telecommunications network is not available,
communicate a second signal to discover the other user devices within the vicinity of the user device,
receiving a second response to the second signal from the other user device,
communicate, to the other user device, a second invitation to establish a second device-to-device (D2D) connection with the other user device,
receive a second acceptance, corresponding to the second invitation, from the other user device,
establish the second D2D connection with the other user device, and use the second D2D connection with the other user device for control information and to communicate with other user device directly.

11. The user device of claim 10, wherein, to communicate the first invitation, the processor-executable instructions cause the processor to communicate a request, to a Mobility Management Entity (MME) of a wireless telecommunications network, to establish the first D2D connection with the other user device.

12. The user device of claim 11, wherein, to receive of the first acceptance message, the processor-executable instructions cause the processor to receive the first acceptance message from the MME.

13. The user device of claim 12, wherein, to obtain of the configuration information, the processor-executable instructions cause the processor to receive the configuration information from the MME.

14. The user device of claim 10, wherein, to establish the second D2D connection, the processor-executable instructions cause the processor to:
   determine whether the user device or the other user device is capable of operating as a master device in a master/slave D2D network,
   when at least one of the user device or the other user device is capable of operating as the master device,
      establish the second D2D connection with the user device or the other user device as the master device, and
   when neither the user device or the other user device is capable of operating as the master device,
      establish the second D2D connection in accordance with an ad hoc D2D network.

15. The user device of claim 14, wherein,
when both the user device or the other user device is capable of operating as the master device, the processor-executable instructions cause the processor to:
   determine which of the user device or the other user device is most capable of operating as the master device, and
   establish the second D2D connection with the master device being the most capable of the user device and the other user device.

16. The user device of claim 15, wherein,
when the second D2D connection includes is established in accordance with the ad hoc D2D network, the processor-executable instructions cause the processor to:
   communicate with a third user device;
   determine whether the third user device is capable of operating as the master device in the master/slave D2D network, and
when the third user device is capable of operating as the master device,
   convert the ad hoc D2D network into the master/slave D2D network with the third user device as the master device of the master/slave D2D network, and
when the third user device is not capable of operating as the master device,
   establishing a third D2D connection, with the third user device, in accordance with the ad hoc D2D network.

17. The user device of claim 14, wherein,
when the second D2D connection includes the user device operating as the master device, the processor-executable instructions cause the processor to:
   initiate a master device mode of the user device; and
when the establishing of the second D2D connection includes the other user device operating as the master device,
   initiate a slave device mode of the user device.

18. A user device comprising:
   a non-transitory memory device storing a plurality of processor-executable instructions; and
   a processor configured to execute the processor-executable instructions, wherein executing the processor-executable instructions causes the processor to:
   determine whether a wireless telecommunications network is available to the user device;
   when the wireless telecommunications network is available to the user device,
      establish a device-to-device connection with another user device based on configuration information received from the wireless telecommunications network;
   when the wireless telecommunications network is not available,
      determine whether another device, operating in a master device mode,
      corresponding to a D2D network, is available to the user devices; when the other device is available,
      receive configuration information from the other device, and establish a D2D connection with the other device based on the configuration information;
   when the other device is not available,
      discover an additional user device in the vicinity of the user device, and
      establishing an ad hoc network by establishing a D2D connection with the additional user device.

19. The user device of claim 18, wherein the ad hoc network operates in accordance with a media control access (MAC) protocol.

20. The user device of claim 18, wherein the other device operating in the master device mode provides at least one of:
   user device synchronization;
   radio resource management; and
   peer-to-peer transmission scheduling.

* * * * *